United States Patent [19]
Milovanovic-Lerik et al.

[11] Patent Number: 4,789,690

[45] Date of Patent: Dec. 6, 1988

[54] POLYURETHANE FOAM AND PROCESS FOR ITS PREPARATION

[75] Inventors: Olga Milovanovic-Lerik, Kilchberg; Hanno R. van der Wal, MA Hulst; Ulrich Tribelhorn, Ebikon, all of Switzerland

[73] Assignee: The Dow Chemical Company, Midland, Mich.

[21] Appl. No.: 31,350

[22] Filed: Mar. 30, 1987

[51] Int. Cl.$^4$ ............................................. C08G 18/58
[52] U.S. Cl. ................................... 521/137; 521/156; 521/163; 521/170; 521/173; 521/174; 521/176; 521/902
[58] Field of Search ............... 521/137, 156, 163, 170, 521/173, 174, 176, 902

[56] References Cited

U.S. PATENT DOCUMENTS

| | | | |
|---|---|---|---|
| 4,305,861 | 12/1981 | Marx et al. | 260/31.6 |
| 4,309,532 | 1/1982 | Cuscurida et al. | 528/361 |
| 4,518,720 | 5/1985 | Cuscurida et al. | 521/156 |

FOREIGN PATENT DOCUMENTS 2146345A  4/1985  United Kingdom.

Primary Examiner—John Kight
Assistant Examiner—S. Acquah

[57] ABSTRACT

A polyurethane foam is the reaction product of at least one polyol and at least one polyisocyanate in the presence of at least one blowing agent. The polyol contains a polymer polyol dispersion prepared by reacting an epoxy resin with an epoxy hardener in the presence of a liquid polyol.

14 Claims, No Drawings

POLYURETHANE FOAM AND PROCESS FOR ITS PREPARATION

BACKGROUND OF THE INVENTION

The present invention relates to polyurethane foams. Polyurethane foams have been very well accepted for many years because of their well known advantages and because of the wide variety of applications for which the foams can be used.

For example, rigid polyurethane foams are useful for producing insulative materials. It is often desirable to modify the properties of the rigid foams, for example to increase their flexibility in order to decrease cracking when a load is put on it.

Flexible and semi-flexible foams are commonly used, among other things, for furniture cushioning, for the fabrication of matresses and in many transportation means, for example for cushioning of seats. For these applications, it is often desirable to use flexible or semi-flexible polyurethane foams with high resilient and/or high load bearing properties.

Different suggestions have been made by those skilled in the art to modify the properties of polyurethane foams in the desired manner.

In U.S. Pat. No. 4,309,532 it is suggested to use a modified aminopolyol in preparing rigid polyurethane foams. The modified polyols are made by reacting a rigid foam polyol initiator having an active hydrogen functionality of at least 4 and an amine with one or more alkylene oxides to extend the polyol chain. An epoxy resin is added in such a manner that it is inserted at selected points along the length of the polyol chain or at the end of the resulting product. In U.S. Pat. No 4,373,034 is suggested use of a modified polyol for preparing flexible polyurethane foams with high load bearing properties. The modified polyols are made by reacting an initiator having an active hydrogen functionality of from 3 to 4 with one or more alkylene oxides to extend the polyol chain, and adding epoxy resin in such a manner that it is inserted at selected points internally along the length of the polyol chain. Unfortunately, the flexible foams have several disadvantages, e.g. the foams are not highly resilient and they are difficult to produce.

Accordingly, it would be desirable to provide polyurethane foams which have high flexibility, high resiliency and/or high load bearing ability.

SUMMARY OF THE INVENTION

One aspect of the present invention is a polyurethane foam which is the reaction product of at least one polyol and at least one polyisocyanate in the presence of at least one blowing agent characterized in that the polyol is at least partially a polymer polyol dispersion prepared by reacting an epoxy resin with an epoxy hardener in the presence of a liquid polyol.

A further aspect of the present invention is a process for preparing a polyurethane foam by reacting at least one polyol and at least one polyisocyanate in the presence of at least one blowing agent, which process is characterized in that the above mentioned polymer polyol dispersion is employed.

By the use of the above mentioned polymer polyol dispersion the physical properties of the polyurethane foam can be influenced selectively, depending on the type and amount of epoxy resin and epoxy hardener used. Whether flexible, semi-flexible or rigid foams are produced depends mainly on the type of polyols, polyisocyanates and blowing agents used. The production of different types of foams is well known in the art.

When producing flexible or semi-flexible foams, by using one of the above mentioned polymer polyol dispersions the load-bearing and/or the resilient properties can be improved considerably, compared to foams which are produced by using a corresponding unmodified polyol. Accordingly, flexible or semi-flexible foams are preferably produced. The advantage also exists of being able to incorporate halogenated groups into the polyol in order to improve the fire resistance, for example by using chlorinated or brominated epoxy resins when preparing the above mentioned polymer polyol dispersions.

DETAILED DESCRIPTION OF THE INVENTION

The polymer polyol dispersions are advantageously prepared by reacting an epoxy resin with an epoxy hardener in the presence of a liquid polyol. Suitable polymer polyol dispersions can be prepared by reacting epoxy resins with epoxy hardeners, said hardeners being an amine, hydrazine, hydrazide or ammonia, such as described in U.S. Pat. No. 4,305,861. The process for producing those polymer polyol dispersions is also taught therein, which teaching is included herein by reference.

Preferably, the polymer polyol dispersions are produced by dissolving the epoxy resins and epoxy hardeners in the polyols in such quantities that the resultant polymer polyol dispersions contain 1 to 50 percent by weight, preferably 5 to 30 percent by weight, polymer particles, based on the total weight of the dispersion. It is of little consequence whether the reagents are dissolved in the polyol together or whether one of the components is placed in the polyol and the other is added as necessary for the reaction. Following this, the polyaddition reaction is allowed to take place at a rate of reaction which can be adjusted by means of the reaction temperature. During this process, the initially clear solution changes into a milky dispersion. The size of the polymer particles in the polyol dispersion can be influenced by the selection of the raw materials as well as their concentration in the polyol and the reaction temperature. Reaction temperatures of generally 0° C. to 150° C., preferably 20° C. to 100° C., most preferably 20° C. to 60° C., work well.

However, if the reaction temperature is too high, agglomeration of the solid particles can take place, depending on the solids content of the dispersion. It is however within the knowledge of the skilled artisan to choose the appropriate reaction temperature.

The reaction times are a function of the temperature and are dependent upon the chemical structure of the epoxy resins and the epoxy hardeners. When using polyamines as epoxy hardeners, for instance, the rate of the polyaddition reaction can be influenced by the amine's basicity as well as by steric factors. Generally, the reaction times are between 30 minutes and 10 days, preferably between 12 hours and 72 hours.

A wide variety of epoxy resins are useful for the purpose of the present invention. The epoxy resins are organic materials having an average of at least 1.5, generally at least 2, reactive 1,2-epoxy groups per molecule. These epoxy resins can have an average of up to 6, preferably up to 4, most preferably up to 3, reactive 1,2-epoxy groups per molecule. These epoxy resins can be monomeric or polymeric, saturated or unsaturated, aliphatic, cyclo-aliphatic, aromatic or heterocyclic and may be substituted, if desired, with other substituents in addition to the epoxy groups, e.g. hydroxyl groups, alkoxyl groups or halogen atoms.

Suitable examples include epoxy resins from the reaction of polyphenols and epihalohydrins, polyalcohols and epihalohydrins, amines and epihalohydrins, sulfur-containing compounds and epihalohydrins, polycarboxylic acids and epihalohydrins, polyisocyanates and 2,3-epoxy-1-propanol (glycide) and from epoxidation of olefinically unsaturated compounds. Preferred epoxy resins are the reaction products of polyphenols and epihalohydrins, of polyalcohols and epihalohydrins or of polycarboxylic acids and epihalohydrins. Mixtures of polyphenols, polyalcohols, amines, sulfur-containing compounds, polycarboxylic acids and/or polyisocyanates can also be reacted with epihalohydrins.

Illustrative examples of epoxy resins useful herein are described in *The Handbook of Epoxy Resins* by H. Lee and K. Neville, published in 1967 by McGraw-Hill, New York, in appendix 4-1, ppgs through 4–56 and U.S. Pat. Nos. 2,633,458; 3,477,990 (particularly column 2, line 39 to column 4, line 75); 3,821,243; 3,970,719; 3,975,397 and 4,071,477 and G.B. Patent Specification No. 1,597,610, all of which are incorporated herein by reference.

Epoxy resins of particular interest in the practice of the present invention include diglycidyl ethers of bisphenol compounds, particularly those compounds represented by the following structure I:

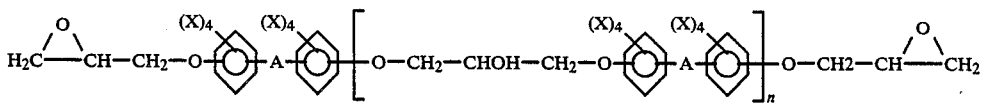

wherein each A is independently a divalent hydrocarbon group having from 1 to about 8 carbon atoms, preferably methylene or isopropylidene, —C(O)—, —O—, —S—, —S—S—, —S(O)—, —S(O)$_2$— or a covalent bond; each X is independently hydrogen, an alkyl group of 1 to 6 carbon atoms or halogen, preferably chlorine or bromine; and n has an average value of from 0 to 35, preferably 0 to 10, most preferably 0 to 2.

The average epoxy equivalent weight is advantageously from 149, preferably from about 170, up to about 3000, preferably up to about 950, most preferably up to about 450.

The average epoxy equivalent weight is the average molecular weight of the resin divided by the number of epoxy groups per molecule. The molecular weight is a weight average molecular weight.

Particularly preferred epoxy resins are those wherein each A is methylene or isopropylidene, each X is independently hydrogen or bromine and n is on the average from 0 to 2. Preferred examples of these resins are bisphenol A type epoxy resins having an average epoxy equivalent weight of from about 170 to about 200. Such resins are commercially available from The Dow Chemical Company, as D.E.R. 330, D.E.R. 331 and D.E.R. 332 epoxy resins. Further preferred examples are brominated bisphenol A type epoxy resins which for example have an average epoxy equivalent weight of from about 300 to about 800. Such epoxy resins can be obtained by reacting an epihalohydrin, such as epichlorohydrin with a polyhydric phenol, for example 4,4'-isopropylidene bisphenol; 2,4'-dihydroxydiphenylethylmethane; 3,3'-dihydroxydiphenyldiethylmethane; 3,4'-dihydroxydiphenylmethylpropylmethane; 2,3'-dihydroxydiphenylethylphenylmethane; 4,4'-dihydroxydiphenylpropylphenylmethane; 4,4'-dihydrodiphenylbutyl-phenylmethane; 2,2'-dihydroxydiphenylditolylmethane; or 4,4'-dihydroxydiphenyltolylmethane.

Other polyhydric phenols which may be coreacted with an epihalohydrin to provide these epoxy polyethers are such compounds as resorcinol, hydroquinone and substituted hydroquinones, e.g. methylhydroquinone.

Further useful epoxy resins are those obtained from the reaction of polyhydric alcohols with epihalohydrins. These alcohols can be polyether polyols or polyester polyols. Preferred epoxy resins are as represented by the structure:

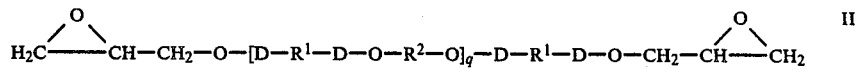

wherein each D is independently C=O or a covalent bond; $R^1$ and $R^2$ have the same or different meanings and each $R^1$ and $R^2$ are independently a branched or unbranched $C_{1-12}$ alkylene group, preferably a $C_{1-6}$ alkylene group, option-ally substituted by hydroxy, $C_{1-6}$ alkoxy or halogen, preferably chlorine or bromine; and q is an average number from 1 to 50.

The most preferred examples of the epoxy resins of structure II are those wherein (a) each D is C=O, $R^1$ is an unbranched $C_{3-6}$ alkylene group, preferably a $C_4$ alkylene group and $R^2$ is a $C_{2-4}$ alkylene group, preferably ethylene or (b) each D is a covalent bond and $R^1$ and $R^2$ are the same or different and have the meaning of ethylene, isopropylene or 1-methyl-propylene and q has the above mentioned meaning.

It is also preferred that $R^1$, $R^2$, D and q are chosen that the average epoxy equivalent weight is from 110 to 2000, most preferably from 170 to 500.

Another class of polymeric epoxy resins which are useful for the purpose of the present invention includes the epoxy novolac resins. The epoxy novolac resins can be obtained by reacting, preferably in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g. phenol itself, or a polyhydric phenol. Further details concerning the nature and preparation of these epoxy novolac resins can be obtained in Lee, H. and Neville, K., Handbook of Epoxy Resins, McGraw Hill Book Co. New York, 1967, which teaching is included herein by reference. Preferred epoxy novolac resins are as represented by the structure:

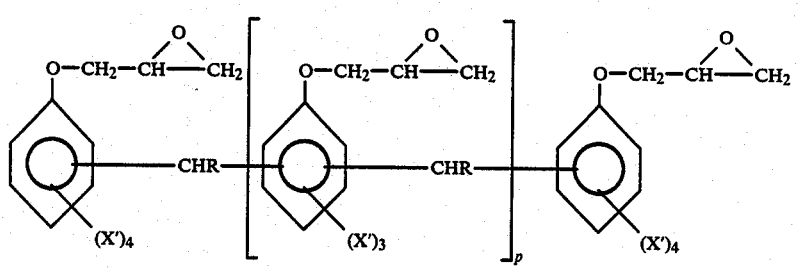

wherein each R is independently hydrogen or an alkyl group having from 1 to 4 carbon atoms, each X' is independently hydrogen, halogen, preferably chlorine or bromine, $C_{1-8}$ alkyl, preferably $C_{1-4}$ alkyl, or hydroxyl; and p has an average value of 0 to 6, preferably 0 to 3, most preferably 0 to 1.

The epoxy novolac resins preferably have an average epoxy equivalent weight of from 160 to 1000, preferably from 170 to 400, most preferably from 170 to 250.

Useful epoxy novolac resins include those having an average value of p of about 0.2 to about 2.1. Epoxy novolac resins having values of p of 0.2, 1.7 and 2.1 are commercially available from The Dow Chemical Company as D.E.N. 431, D.E.N. 438 and D.E.N. 439 resins, respectively.

Preferably used are epoxy resins which are directly soluble in the polyols. Of course, those epoxy resins which can be brought into solution by using a solubilizing agent may also be employed. Solubilizing agents which chemically participate in the hardening reaction may also be used. On a preferred basis, these include low viscosity monoepoxides or primary monoamines.

As an alternative, the epoxy resin can be dissolved in an inert solvent, for example in a hydrocarbon like toluene, which solution can then be added to the polyol.

A wide range of epoxy hardeners can be used when preparing the polyol dispersions. The most useful hardeners are those compounds which have two or more —$NH_2$ groups.

Those epoxy hardeners which may be employed are primarily the multifunctional, preferably di- to hexafunctional, and particularly di- to tetrafunctional, primary amines, amides, hydrazides and hydrazine.

Suitable hydrazides include adipic acid dihydrazide and tetramethylene-1,4-carboxylic acid hydrazide.

Preferably used are alkyl-substituted aliphatic, cycloaliphatic, and/or aromatic polyamines, particularly di-primary amines with 1 to 4 carbon atoms in the alkyl radical and weight average molecular weights of 30 to 600, preferably 60 to 400. Examples include aliphatic alkylene polyamines, e.g. diamines, with 2 to 12, preferably 2 to 6, most preferably 2 to 4; carbon atoms in the alkylene radical such as ethylenediamine; 1,3-diaminopropane; 1,4-butylenediamine; 1,6-hexamethylenediamine; 1,10-decamethylenediamine; N,N'- and N,N-dimethylethylenediamine; N-methyldipropylenetriamine; dipropylenetriamine; diethylenetriamine; triethylenetetramine; tetraethylenepentamine; hexaethyleneheptamine; cycloaliphatic di- and polyamines such as 1,4-, 1,3- and 1,2-cyclohexylenediamine; 4,4'-, 2,4'- and 2,2'-diaminodicyclohexylmethane; 1-methyl-2,4-diaminocyclohexane; 1-methyl-2,6-diaminocyclohexane and 3-aminomethyl-3,5,5-trimethylcyclohexylamine. Ethylene diamine is the most preferred epoxy hardener.

Further useful amine hardeners are ethanolamine; amino-ethylethanolamine; methylimino-bis(propyl)amine; imino-bis(propyl)amine; bis(aminopropyl)piperazine; aminoethyl-piperazine; polyoxyalkyleneamines and bis-(p-aminocyclohexyl)methane. Mixtures of two or more amines are also useful.

Generally about 0.3 to about 2.5, preferably about 0.4 to about 1.5, moles of the epoxy hardener, preferably selected from the amines, are used per mole of the epoxy resins.

Preferably used are epoxy hardeners which are directly soluble in the polyols. Epoxy hardeners which can be brought into solution by using a solubilizing agent if necessary may also be employed. As an alternative, the epoxy hardener can be dissolved in an inert solvent which can be added to the polyol.

Liquid polyols, suitable as dispersing medium, have functionalities of from 2 to 8, preferably of from 2 to 4. "Liquid" means that the polyols are liquid at the temperature of the reaction of the epoxy resin and the epoxy hardener. Preferably used are polyester polyols and particularly polyoxyalkylene polyether polyols.

The polyester polyols may be produced, for instance, from the reaction of polycarboxylic, preferably dicarboxylic, acids and multifunctional alcohols, preferably diols. The polycarboxylic acid is preferably succinic, glutaric or alipic acid. Preferred examples of the alcohol are ethylene glycol, 1,4-butanediol and 1,6-hexanediol. The polyester polyols generally have weight average molecular weights of from 200, preferably of from 800, most preferably of from 1500, to 10000, preferably to 7000, most preferably to 3500.

Preferably used as polyols are polyoxyalkylene polyether polyols which are produced by known processes such as the reaction of one or more alkylene oxides with 2 to 6, preferably 2 to 4, carbon atoms in the alkylene radical and an initiator molecule containing 2 to 8, preferably 2 to 4, active hydrogen atoms. Suitable alkylene oxides include 1,3-propylene oxide, 1,2- and 2,3-butylene oxide, and preferably, ethylene oxide and 1,2-propylene oxide. Tetrahydrofuran and styrene oxide may also be employed. The alkylene oxides may be used individually, alternatingly in sequence, or in mixtures.

Examples of initiator molecules include lower polyols, polyamines and aminoalcohols having a total of two or more reactive hydrogen atoms on hydroxyl and/or primary or secondary amino groups. Suitable polyols include diols such as ethylene glycol, propylene glycol, diethylene glycol, dipropylene glycol, 1,4-butanediol and 1,6-hexamethylene glycol, triols, such as glycerol, trimethylolpropane, butanetriols, hexanetriols, trimethylolphenol, novolacs, trialkanolamines; various tetrols, such as erythritol and pentaerythritol; pentols; hexols, such as dipentaerythritol and sorbitol, and sucrose; carbohydrates; polyhydroxy fatty acid esters, such as castor oil; and polyoxyalkylated derivatives of polyfunctional compounds having three or more reactive hydrogen atoms, such as, for example, the reaction product of trimethylolpropane, glycerol and other polyols with ethylene oxide, propylene oxide or other epoxides, or copolymers thereof, e.g. copolymers of ethylene and propylene oxides. Higher functional amino-alcohols and polyamines include, for example, ethanolamine, diethanolamine, triethanolamine, isopropanolamine, diiso-propanolamine, triisopropanolamine, 2-(2-aminoethylamino)ethanol, 2-amino-2-(hydroxymethyl)-1,3-propanediol, N-methyl- and N-ethyldiethanolamine and triethanolamine; hydrazines; N-monoalkyl-, N,N- and N,N'-dialkyl-substituted diamines with 1 to 4 carbon atoms in the alkyl radical such as an aminoalkyl piperazine like aminoethyl piperazine; mono- and dialkyl-substituted ethylenediamines; 1,2- or 1,3-propylenediamine; 1,4-butylenediamine; 1,6-hexa-methylenediamine; and 4,4'-, 2,4'- and 2,2'-diaminodi-phenylmethane; diethylenetriamine, triethylenetetraamine, urea and urea-formaldehyde polymers, as well as various aryl polyamines, such as 4,4',4''-methylidenetrianiline.

Primarily used are di- and/or trifunctional polyoxyalkylene polyether polyols having weight average molecular weights of from 200 to 10000, preferably of 800 to 7000, most preferably of 2500 to 6500, which contain ethylene oxide as well as 1,2-propylene oxide units in the oxyalkylene chain. These units may be arranged either randomly or in blocks in the oxyalkylene chain.

Preferred polyether polyols are those described in U.S. Pat. No. 3,194,773 which teaching relating to the polyols is included herein by reference.

The most preferred polyether polyols are polyethers prepared from alkylene oxides which have 2 to 4 carbon atoms, preferably propylene oxide and/or ethylene oxide, and initiators having a functionality of two or more.

Preferred polyethers of the branched type are those prepared by adding propylene oxide alone or in combination with ethylene oxide to various polyols, preferably diols and triols, as starters to produce adducts of various molecular weights. Polyethers which deserve special mention are propylene oxide or propylene oxide/ethylene oxide adducts of 1,2,6-hexanetriol, 1,1,1-tris(hydroxymethyl)propane (trimethylolpropane) and glycerol having molecular weights (weight average value) of from 1000 to 10 000, preferably from 2000 to 7000. These polyethers can be homo- or heteropolymers.

Preferred types of polyethers are block copolymers prepared from propylene and ethylene oxide with the above described higher functional initiators. Block copolymers containing no more than about 35 weight percent of ethylene oxide are preferred. The most preferred polyether polyols are those derived from glycerol as an initiator which is first partially alkoxylated with a $C_{3-4}$ alkylene oxide component, for example 1,3-propylene oxide, 1,2- or 2,3-butylene oxide, preferably 1,2-propylene oxide, and then ethoxylated with ethylene oxide. These polyols are, for example, represented by the following structure IV

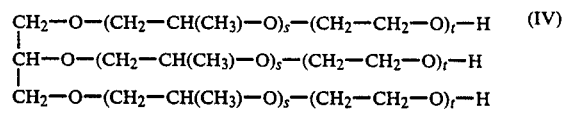

wherein s and t are numbers of such size that the polyol's weight average molecular weight is from 1000 to 10000, preferably from 2000 to 7000, and t is of such size that the polyether polyol contains from 1 to 25, preferably from 5 to 20, weight percent ethylene oxide units, based upon the total molecular weight.

The polyols of structure IV are preferably used with polyether polyols which are derived from glycerol as an initiator and which is alkoxylated with 1,2-propylene oxide and ethylene oxide to give a polyol with randomly distributed propylene oxide and ethylene oxide groups.

The epoxy resin and the epoxy hardener, preferably an amine type hardener, can be reacted in one of the above mentioned polyols. As an alternative, the epoxy hardener and the epoxy resin can be reacted in an organic inert solvent like a benzene, toluene or tetrahydrofuran, and then added to the polyol.

When reacting epoxy resins and epoxy hardeners in the polyols, optional additives can be used for accelerating the reaction between the epoxy resins and the epoxy hardeners. Such catalysts are known in the art. Suitable catalysts are, for example, amines, preferably ethylene diamine, diethylene triamine, triethylene tetraamine, aminoethyl piperazine, organic acids, e.g. dicarboxylic acids, phenol compounds, imidazole and its derivatives, and calcium nitrate. Imidazole is a preferred catalyst.

As already indicated, the produced polymer polyol dispersons contain 1 to 50 percent by weight of polymer particles, preferably 5 to 30 percent by weight, based on the total dispersion weight. With a polymer content of 10 percent by weight in the polyether polyol at 25° C., the dispersions generally have viscosities of up to 2500 mPa.s, preferably from 1000 to 1700 mPa.s.

The polymer particles in the dispersion generally have average diameters of 10 nm to 10000 nm, preferably of 50 nm to 5000 nm, most preferably of 100 nm to 3000 nm.

The polymer polyol dispersions are reacted with polyisocyanates in the presence of a blowing agent. Before reacting the polyol dispersion with the polyisocyanate(s), the polyol dispersion can be mixed with any unmodified polyol, as mentioned above. For example, the polyol used as dispersing agent in the dispersion and the polyol used for diluting the dispersion can be the same.

Essentially any organic polyisocyanate may be used. Thus, it is possible in accordance with the present invention to utilize aliphatic, cycloaliphatic, aromatic-aliphatic, aromatic and heterocyclic polyisocyanates, as for example described in Justus Liebig's Annalen der Chemie, 562, pages 75 to 136 by W. Siefgen, the disclosure of which is included by reference.

Specific examples of useful isocyanates include, for example, ethylene diisocyanate; 1.4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and any mixtures of these isomers, 1-isocyanato-3,3,5-trimethyl-5-isocyanato-methylcylohexane (German Auslegeschrift 12 02 785); 2,4- and 2,6-hexahydrotoluylene diisocyanate as well as any mixtures of these isomers; hexahydro-1,3- and/or -1,4-phenylenediisocyanate; perhydro-2,4'- and/or -4,4'-diphenylmethanediisocyanate; 1,3- and 1,4-phenylene diisocyanate; 2,4- and 2,6-toluene diisocyanate and any mixtures of these isomers; diphenyl-methane-2,4'-and/or -4,4'-diisocyanate; naphthylene-1,5-diisocyanate; triphenyl methane-4,4', 4"-triisocyanate; polyphenyl polymethylene polyisocyanates which may be obtained by condensing aniline with formadehyde, followed by phosgenation as described, for example, in British Pat. No. 874,430 and 848,671; perchlorinated aryl polyisocyanates of the type described in German Auslegeschrift 1,157,601; polyisocyanates containing carbodiimide groups, of the type described in German Pat. No. 1,092,007; the diisocyanates in U.S. Pat. No. 3,492,330; polyisocyanates containing allophanate groups of the type described for example in British Pat. No. 994,890, Belgian Pat. No. 761,626 and published Dutch Pat. Application No. 7,102,524; polyisocyanates containing isocyanate groups of the type described, for example, in German Pat. Nos. 1,022,789; 1,222,067 and 1,027,394 and in German Offenlegungsschriften Nos. 1,929,034 and 2,004,048; polyisocyanates containing urethane groups as described in U.S. Pat. No. 3,394,164; polyisocyanates containing acylated urea groups such as are described in German Pat. No. 1,230,778; polyisocyanates containing biuret groups of the type described, for example, in German Pat. No. 1,101,394, in British Pat. No. 889,050 and in French Pat. No. 7,017,514; polyisocyanates obtained by telomerization reaction as described in Belgian Pat. No. 723,640; poly-isocyanates containing ester groups of the type described, for example, in British Pat. No. 956,474 and 1,072,956, U.S. Pat. No. 3,567,763 and in German Pat. No. 1,232,688; and reaction products of the above mentioned isocyanates with acetals as described in German Pat. No. 1,072,385. Useful polyisocyanates are furthermore those described in U. S. Pat. No. 3,194,773. It is also possible to use the distillation residues containing isocyanate groups which accumulate in the industrial-scale production of isocyanates, optionally in solution in one or more of the above mentioned polyisocyanates. It is also possible to use mixtures of the aforementioned polyisocyanates.

In general, it is particularly preferred to use the most readily available polyisocyanates, such as 2,4- and 2,6-toluene diisocyanate or mixtures of these isomers (TDI), polyphenyl-polymethylene polyisocyanates, of the type obtained by condensing aniline with formaldehyde, followed by phosgenation (crude MDI); or polyisocyanates containing carbodiimide groups, urethane groups, allo-phanate groups, isocyanurate groups, urea groups or biuret groups (so-called modified polyisocyanates) or mixtures of any of these polyisocyanates.

Preferably, the organic polyisocyanate is employed in an excess of 0 to 25 weight %, preferably 0 to 15 weight %, based on the weight of polyisocyanate which is theoretically consumed in the reaction. However, it is also possible to employ only 80 to 100, for example 90 to 100, weight percent of the amount of polyisocyanate which is theoretically consumed in the reaction.

The blowing agents employed in the process of this invention include any compound capable of generating an inert gas under the conditions used to produce the foaming reaction product (e.g. by reaction to produce a gas or by volatilization). Suitable blowing agents include volatile halocarbons (especially chlorocarbons and chlorofluor-carbons) such as trichloromonofluoromethane, dichlorodifluoromethane, dichloromonofluoromethane, dichloromethane, trichloromethane, bromotrifluoromethane, chlorodifluoromethane, chloromethane, 1,1-di-chloro-1,1-fluoroethane, 1,1-dichloro-1-fluoroethane, 1-chloro-ethane, 1,1-difluoroethane, 1,1-dichloroethane, 1,2,2-trichloroethane, chloropentafluorethane, 1-chloro-1-fluorethane, 1-chloro-2-fluoroethane, 1,1,2-trifluoro-ethane, 1,1,1-trifluorobutane, 2-chloro-2-fluorobutane, 3,3-difluorobutane, 1,1,1-trifluorobutane, hexafluorocyclobutane and octafluorobutane. Other useful blowing agents include low-boiling hydrocarbons such as butane, pentane, hexane, cyclohexane and the like. Mixtures of blowing agents can be used as well. Furthermore, gas generating blowing agents, for example water, are suitably used.

Suitable blowing agents are, for example, described in U.S. Pat. Nos. 4,125,487 and 3,753,933 and so much of these patents as pertains to blowing agents is incorporated herein by reference.

Foaming can also be caused by injecting an inert gas into the reaction mixture. Suitable inert gases include, for example, nitrogen, oxygen, carbon dioxide, xenon, helium and mixtures thereof such as air.

The amount of blowing agent employed will vary with the density desired in the foam product and the blowing agent used. Volatile halocarbons or hydrocarbons can generally be used in an amount of from 1 to 50, preferably of from 2 to 30, weight percent, based on the weight of the polyol of the polymer polyol dispersion. Water can generally be used in an amount of from 0 to 6, preferably of from 0.5 to 5, most preferably of from 1.5 to 4 weight percent, based on the weight of polyol of the polymer polyol dispersion.

Optionally additives such as foaming catalysts, silicones, coloring agents and fire retardant agents may be used when producing the foams.

The catalysts which are optionally employed in the process of the present invention in order to accelerate the reaction between the polyisocyanate(s) and the polyol(s) include, for example, organo-metal compounds, tertiary amines, alkaki metal alkoxides, or mixtures thereof.

Suitable organo-metal catalysts include, for example, organo-metal compounds or salts of tin, for example those described in U.S. Pat. No. 3,194,773, zinc, lead, mercury, cadmium, bismuth, antimony, iron, manganese, cobalt, copper or vanadium. Suitable, for example, are metal salts of a carboxylic acid having from about 2 to about 20 carbon atoms including stannous octoate, dimethyltin dilaurate, dibutyltin dilaurate, dibutyltin diacetate, ferric acetyl acetontate, lead octoate, lead oleate, phenylmercuric propionate, lead naphthenate, manganese naphthenate, copper nahpthenate, vanadyl naphthenate, cobalt octoate, cobalt acetate, copper oleate, vanadium pentoxide, or mixtures thereof.

Suitable amine catalysts include, for example, triethylene-diamine, triethylamine, tetramethylbutanediamine, N,N-di-methylethanolamine, N-ethylmorpholine, bis-(2-dimethyl-aminoethyl)ether, N-methylmorpholine, N-ethylpiperidine, 1,3-bis(dimethylamino)-2-propanol, N,N,N',N'-tetramethylethylenediamine, or mixtures thereof.

Suitable alkali metal alkoxides which can be employed include, for example, sodium ethoxide, potassium ethoxide, sodium propoxide, potassium propoxide, sodium butoxide, potassium butoxide, potassium propoxide, sodium butoxide, potassium butoxide, lithium ethoxide, lithium propoxide, lithium butoxide, alkali metal salts of polyols such as described in U.S. Pat. No. 3,728,308, or mixtures thereof.

Preferably, these urethane catalysts are in liquid form, but if they are inherently a solid at the application temperature, then they may be dissolved in an appropriate liquid, such as, for example, dipropylene glycol or they may be dissolved or dispersed in one of the components.

The catalysts, when employed, can be employed in quantities of from 0.001 to 5, preferably from 0.01 to 2 parts per 100 parts of total polyol employed depending on the activity of the catalyst. Very weak catalysts could be employed in quantities above 5 parts per 100 parts of polyol. The parts are weight parts.

If desired, cell control agents can be employed. Suitable cell control agents which can be employed herein include silicone oils such as, for example DC-193, DC-195, DC-197 and DC-198 commercially available from Dow Corning Corp.; SF-1034, PFA-1635, PFA-1700 and PFA-1660 commercially available from General Electric Co.; L-520, L-5320 and L-5340 commercially available from Union Carbide Corp.; and B-1048 and B-4113, B-4380, B-8629 and B-8650 commercially available from TH. Goldschmidt, AG., or mixtures thereof. Cell control agents, when employed, can generally be employed in quantities of from 0.1 to 5.0, preferably of from 0.2 to 2.5 weight %, based upon the total weight of polyols used.

The process for producing polyurethane foams in the presence of water and/or organic blowing agents as well as additives which are well-known in the polyurethane foaming technology, is known in the art.

The process of the present invention differs from the known processes in that above mentioned polymer polyol dispersions are employed alone or in combination with conventional unmodified polyols for reacting with polyurethanes.

The properties of the foams produced therefrom can be improved in the desired manner. When producing flexible foams, the hardness, the tensile strength and the tear strength can be increased considerably, compared to foams which have been prepared using unmodified polyols.

The following examples illustrate the present invention. Unless otherwise mentioned, all parts and percentages are weight parts and weight percentages. The examples should not be construed to limit the present invention.

EXAMPLES 1-7

(A) Production of the Polymer Polyol Dispersion Sample Nos. 1-3

The following compounds are used to prepare polyol dispersions:

Polyether triol A is a 4800 molecular weight polyether prepared by reacting glycerol with propylene oxide and capping the obtained intermediate with 13-15% ethylene oxide, based upon the total weight.

Epoxy resin A has a structure as indicated in Structure I wherein each X is hydrogen, each A is —C(CH$_3$)$_2$— and n has an average value of about 0-0.1.

Epoxy resin B is an epoxy novolac resin having a structure as indicated in Structure III wherein each X', each R is hydrogen and p has an average value of 0.2.

Into a 100 ml glass flask are charged 93.8 g polyether triol A and 20.0 g expoxy resin A. The mixture is stirred with a magnetic stirrer until a clear solution results. Then, 3.45 g ethylene diamine are added (the molar ratio between the ethylene diamine and the epoxy resin being 1.0). The resulting mixture is stirred for about three minutes. The flask is then transferred into a 50° C. over wherein the epoxy resin and the hardener react over a period of 48 hours to form a polymer polyol dispersion. (Sample No. 1). The calculated solids content of the dispersion is 20%.

Sample No. 2 is prepared in like manner, this time using 91 g polether triol A, 20 g epoxy resin A and 2.76 g ethylene diamine. The calculated solids content of the dispersion is again 20%.

Sample No. 3 is prepared by dissolving 0.01 g imidazole in 98.3 g polyether triol A at 50° C. while stirring with a magnetic stirrer. Afterwards, 16.1 g epoxy resin B are added and the mixture is stirred until homogenous, at which time 2.19 g ethylene diamine are added. The molar ratio between the ethylene diamine and the epoxy resin is 0.81. The resulting mixture is stirred for two minutes at 2000 revolutions per minute.

The mixture is left at room temperature for 24 hours and afterwards transferred into a 60° C. oven at for 48 hours. The calculated solids content of the dispersion is 15.7%.

In dispersion Sample Nos. 1-3, the solids content is calculated as the sum of the weight of the epoxy resin and the the ethylene diamine divided by the weight of the total reaction mixture.

(B) Foam production using dispersion Sample Nos. 1-3

A mixture of 60 parts polyether triol A and 40 parts polymer polyol dispersion Sample No. 1 is prepared. Based on 100 weight parts polyol/polymer polyol dispersion, the following compounds are added to the mixture:

TABLE 1

| Component | Parts by Weight |
| --- | --- |
| Water | 2.5 |
| Trichlorofluoromethane | 10.0 |
| Silicone Surfactant[1] | 0.4 |
| Triethylene diamine solution[2] | 0.8 |
| dimethylethanolamine | 0.2 |
| triethylamine | 0.25 |

[1]B-4113, available from T. H. Goldschmidt.
[2]A 33% solution in propylene glycol.

The mixture is stirred for 60 sec. at 1400 revolutions per minute using a 90 mm mixing disc. The temperature of the mixture is adjusted to 20±0.5° C. To this mixture is then added a blend of 60 parts 4,4'-MDI and 40 parts of an 80/20 mixture of 2,4- and 2,6-TDI. The amount of the isocyanate blend is adjusted to provide an isocyanate index of 90 in examples 1 and 2, 100 in examples 3 and 4 and 110 in examples 5 and 6. The resulting mixture is stirred for 8 sec. before it is poured into a test mould of 56 cm×59.5 cm×15 cm. The temperature of the mould is maintained at 30° C., and the resulting foam piece is removed from the mould after 10 minutes. The fill time is 73 seconds for examples 1 and 2, 68 seconds for Example 3 and 4 and 64 seconds for examples 5 and 6. The string times for examples 1-6 are 98, 94, 93, 93, 92 and 91 seconds, respectively.

Foam example 7 is prepared in like manner, this time using as the polyol component a mixture of 50 weight parts polyether triol A and 50 weight parts polymer polyol dispersion Sample No. 2. The isocyanate index is 100, the fill time is 67 seconds and the string time is 89 seconds.

Comparative foam examples A to E are prepared in similar manner, except instead of the mixture of 60 weight parts polyether triol A and 40 weight parts polyol dispersion Sample No. 1 used in examples 1 to 6, 100 weight parts of the polyether triol A are used. The isocyanates and all other additives used are the same as used in examples 1 to 6. The isocyanate index is 90 for comparative examples A and B, 100 for comparative samples C and D and 110 for comparative sample E. Fill times for comparative samples A to E are 73, 74, 69, 70 and 65 seconds, respectively. String times for comparative samples A–E are 99, 98, 99, 100 and 100 seconds, respectively.

The physical properties of Example Nos. 1–7 and Comparative Samples A–E are as indicated in Table 2 following.

and 80 seconds, respectively and string times of 107, 109 and 109 seconds, respectively.

Comparative examples F to H are prepared in like manner, except instead of the mixture of 40 weight parts polyether triol A and 60 weight parts polyol dispersion sample no. 3 used in examples 8 to 10, 100 weight parts of the polyether triol A are used. The additional components and the conditions for producing the foam are the same as in examples 8 to 10. The isocyanate index for comparative examples F–H are 90, 100 and 110, respectively. The comparative examples F–H have fill times of 74, 70, and 65 seconds, respectively and string times of 99, 100 and 100 seconds, respectively. The physical properties of examples 8–10 and comparative examples F–H are as reported in Table 4.

TABLE 2

| Properties | Examples | | | | | | | Comparative Examples | | | | |
|---|---|---|---|---|---|---|---|---|---|---|---|---|
| | 1 | 2 | 3 | 4 | 5 | 6 | 7 | A | B | C | D | E |
| Density, kg/m$^3$ | 47.5 | 47.7 | 47.2 | 47.7 | 47.7 | 47.7 | 47.5 | 48.0 | 48.0 | 47.6 | 47.7 | 47.7 |
| Tensile Strength$^1$, kPa | 82 | 83 | 102 | 99 | 117 | 120 | 93 | 61 | 57 | 73 | 70 | 87 |
| Elongation$^1$, % | 113 | 114 | 110 | 112 | 102 | 101 | 104 | 122 | 122 | 115 | 116 | 111 |
| Tear Strength$^2$, N/m | 357 | 360 | 423 | 407 | 490 | 475 | 409 | 273 | 257 | 317 | 313 | 423 |
| Compression Set$^3$, % | 8.8 | 8.6 | 6.5 | 6.8 | 5.9 | 5.9 | 8.6 | 6.5 | 6.7 | 5.3 | 5.5 | 4.9 |
| Resiliency$^4$, % | 65 | 65 | 66 | 66 | 65 | 65 | 64 | 66 | 66 | 68 | 67 | 67 |
| 40% CLD$^5$, kPa | 2.08 | 2.09 | 2.89 | 2.87 | 3.62 | 3.61 | 2.31 | 1.58 | 1.60 | 1.95 | 1.96 | 2.60 |
| Hysteresis$^5$, % | N.D. | 15 | 15 | N.D. | 15 | N.D. | 14 | 12 | N.D. | 12 | N.D. | 13 |
| Modulus$^6$ | 2.6 | 2.5 | 2.6 | 2.6 | 2.6 | 2.6 | 2.6 | 2.5 | 2.6 | 2.6 | 2.5 | 2.5 |

N.D. means not determined.
$^1$ASTM D-638
$^2$DIN 53575
$^3$DIN 53572: 90% at 70° C.
$^4$ASTM D3574
$^5$DIN 53577. CLD is compression load deflection.
$^6$Ratio of 65% CLD to 25% CLD. CLD measured according to DIN 3577.

Examples 1 to 7 and comparative examples A to E show that a considerably increased tear resistance, tensile strength and hardness (40% compression load deflection, CLD) is attained when a polymer polyol dispersion described herein is used for producing the polyurethane foams of the present invention.

EXAMPLES 8–10

Foam sample nos. 8–10 are prepared by mixing 40 parts polyether triol A and 60 weight parts polymer polyol dispersion sample no. 3. Based upon 100 weight parts polyol/polymer dispersion, the following compounds are added to the mixture:

TABLE 3

| Component | Parts by Weight |
|---|---|
| Water | 2.5 |
| Trichlorofluoromethane | 11.0 |
| Silicone Surfactant$^1$ | 0.4 |
| Triethylene diamine solution$^2$ | 0.8 |
| dimethylethanolamine | 0.2 |
| triethylamine | 0.25 |

$^1$B-4113, available from T. H. Goldschmidt.
$^2$A 33% solution in propylene glycol.

The mixture is stirred for 60 sec. at 1400 revolutions per minute using a 90 mm mixing disc. The temperature of the mixture is adjusted to 20±1° C. The isocyanate blend described with respect to examples 1–6 at 20±1° C. is quickly added to the polyol mixture and stirred for 8 sec. before it is poured into a test mould of 56 cm×59.5 cm×15 cm. The temperature of the mould is held at 30° C. and the resulting foam piece is removed from the mould after 10 minutes. The isocyanate index for examples 8–10 are 90, 100 and 110, respectively. The ecomparative examples F–H have fill times of 87, 83,

TABLE 4

| Properties | Examples | | | Comparative Examples | | |
|---|---|---|---|---|---|---|
| | 8 | 9 | 10 | F | G | H |
| Density, kg/m$^3$ | 47.5 | 47.0 | 47.1 | 48.1 | 47.7 | 47.7 |
| Tensile Strength$^1$, kPa | 107 | 112 | 139 | 59 | 72 | 87 |
| Elongation$^1$, % | 116 | 108 | 106 | 122 | 116 | 111 |
| Tear Strength$^2$, N/m | 420 | 500 | 558 | 265 | 315 | 423 |
| Compression Set$^3$, % | 4.8 | 7.1 | 7.3 | 6.6 | 5.4 | 4.9 |
| Resiliency$^4$, % | 65 | 66 | 65 | 66 | 68 | 67 |
| 40% CLD$^5$, kPa | 2.21 | 2.78 | 3.65 | 1.60 | 1.96 | 2.60 |
| Modulus$^6$ | 2.5 | 2.6 | 2.7 | 2.5 | 2.6 | 2.5 |

$^1$ASTM D-638
$^2$DIN 53575
$^3$DIN 53572: 90% at 70° C.
$^4$ASTM D3574
$^5$DIN 53577. CLD is compression load deflection.
$^6$Ratio of 65% CLD to 25% CLD. CLD measured according to DIN 3577.

Examples 8 to 10 and comparative examples F to H demonstrate again that considerably increased tear resistance, tensile strength and hardness (40% CLD) are attained when a polymner polyol dispersion described herein is used for producing the polyurethane foams of the present invention.

EXAMPLE 11

(A) Production of the polymer polyol dispersion sample no. 4

A mixture of 570 g of a liquid epoxy resin of structure I wherein each A is isopropylidene, each X is hydrogen and n has an average value of about 0.15 and 1400 g polyether triol A is stirred at room temperature until the epoxy resin is dissolved. Then 44.6 g ethylene diamine are added dropwise. A slight exotherm develops and the temperature goes up from 20° to 35° C. Stirring is continued for 2 hours. The product is left over night without stirring. The next day, stirring is continued for another 6 hours. The solids content of the resulting dispersion is 30 percent.

(B) Foam production

The components used for producing a high resilience slabstock foam (Example 11) are described in Table 5. The physical properties of the resulting foam are as described in Table 6.

TABLE 5

| Component | Parts by Weight |
|---|---|
| Dispersion Sample No. 4 | 30 |
| Polyether triol A | 70 |
| Water | 2.5 |
| Diethanolamine | 0.8 |
| Triethylenediamine solution[1] | 0.15 |
| Niax A-1 catalyst[2] | 0.05 |
| Silicone surfactant[3] | 0.85 |
| Stannous octoate | 0.15 |
| Isocyanate blend[4] | 37.2(105 index) |

[1] A 33% solution in propylene glycol.
[2] An organotin catalyst, sold by Union Carbide Corp.
[3] Tegostab B8614, sold by T. H. Goldschmidt AG.
[4] Described in Examples 1–6.

TABLE 6

| Density, kg/m$^3$ | 35.0 |
|---|---|
| 40% CLD[1] kPa | 2.34 |
| Resiliency[2], % | 58 |

[1] ASTM D3574
[2] DIN 53577. CLD is compression load deflection.

What is claimed is:

1. A polyurethane foam which is the reaction product of at least one polyol and at least one polyisocyanate in the presence of at least one blowing agent wherein the polyol is at least partially a polymer polyol dispersion prepared by reacting an epoxy resin with from about 0.3 to about 2.5 moles of an epoxy hardener per mole of epoxy resin, in the presence of a liquid polyol.

2. The polyurethane foam of claim 1 wherein the epoxy resin is the reaction product of a polyphenol with an epihalohydrin, a polyalcohol with an epihalohydrin, an amine with an epihalohydrin, a sulfur-containing compound with an epihalohydrin, a polycarboxylic acid with an epihalohydrin or a polyisocyanate with a 2,3-epoxy-1-propanol, or is obtained from the epoxidation of an olefinically unsaturated compound.

3. The polyurethane foam of claim 1 wherein the epoxy resin is the reaction product of a polyphenol and an epihalohydrin, a polyalcohol and an epihalohydrin, or a polycarboxylic acid and an epihalohydrin.

4. The polyurethane foam of claim 1 wherein the epoxy hardener has two or more —NH$_2$ groups.

5. The polyurethane foam of claim 4 wherein the epoxy hardener is an alkylene diamine wherein the alkylene group has 2 to 6 carbon atoms.

6. The polyurethane foam of claim 5 wherein prior to reaction with the epoxy hardener, the epoxy resin contains on the average from 1.5 to 6 epoxy groups per molecule.

7. The polyurethane foam of claim 6 wherein the epoxy resin is represented by the structure.

$$\text{H}_2\text{C}\underset{\diagdown}{\overset{O}{\diagup}}\text{CH}-\text{CH}_2-\text{O}-\underset{(X)_4}{\bigcirc}-A-\underset{(X)_4}{\bigcirc}-\left[\text{O}-\text{CH}_2-\text{CHOH}-\text{CH}_2-\text{O}-\underset{(X)_4}{\bigcirc}-A-\underset{(X)_4}{\bigcirc}\right]_n-\text{O}-\text{CH2}-\text{CH}\underset{\diagdown}{\overset{O}{\diagup}}\text{CH}_2 \qquad \text{I}$$

wherein each A is independently a divalent hydrocarbon group having from 1 to 8 carbon atoms, —C(O)—, —O—, —S—, —S—S—, —S(O)—, —S(O)2— or a covalent bond, each X is independently hydrogen, an alkyl group of 1 to 6 carbon atoms, chlorine or bromine, and n has an average value of from 0 to 35.

8. The polyurethane foam of claim 6 wherein the epoxy resin is an epoxy novolac resin represented by the structure $$\left[\underset{(X')_4}{\bigcirc}\overset{\text{O}-\text{CH}_2-\text{CH}\underset{\diagdown}{\overset{O}{\diagup}}\text{CH}_2}{}\right]-\text{CHR}-\left[\underset{(X')_3}{\bigcirc}\overset{\text{O}-\text{CH}_2-\text{CH}\underset{\diagdown}{\overset{O}{\diagup}}\text{CH}_2}{}-\text{CHR}-\right]_p\underset{(X')_4}{\bigcirc}\overset{\text{O}-\text{CH}_2-\text{CH}\underset{\diagdown}{\overset{O}{\diagup}}\text{CH}_2}{} \qquad \text{III}$$

wherein each R is independently hydrogen or an alkyl group have from 1 to 4 carbon atoms, each X' is independently hydrogen, halogen, C$_{1-8}$ alkyl or hydroxyl, and p has an average value of 0 to 6.

9. The polyurethane foam of claim 1 wherein the polyol of the polymer polyol dispersion is a liquid dito tetrafunctional polyester polyol or polyether polyol which has an weight average molecular weight of from 800 to 7000.

10. The polyurethane foam of claim 9 wherein the polyol in the polymer polyol dispersion is a block copolymer prepared from an initiator having a total of two or more reactive hydrogen atoms or hydroxyl and/or primary or secondary amine groups and one or more C$_{2-6}$ alkylene oxides.

11. The polyurethane foam of claim 10 characterized in that the polyol in the polymer polyol dispersion is a block copolymer of the structure IV $$\text{CH}_2-\text{O}-(\text{CH}_2-\text{CH}(\text{CH}_3)-\text{O})_s-(\text{CH}_2-\text{CH}_2-\text{O})_t-\text{H}$$
$$\text{CH}-\text{O}-(\text{CH}_2-\text{CH}(\text{CH}_3)-\text{O})_s-(\text{CH}_2-\text{CH}_2-\text{O})_t-\text{H}$$
$$\text{CH}_2-\text{O}-(\text{CH}_2-\text{CH}(\text{CH}_3)-\text{O})_s-(\text{CH}_2-\text{CH}_2-\text{O})_t-\text{H}$$

wherein s and t are of that size that the weight average molecular weight is from 2000 to 7000, and t is such that the polyether polyol contains from 1 to 25 weight % ethylene oxide units, based upon the total molecular weight.

12. The polyurethane foam of claim 1 wherein the polymer polyol dispersion contains from 5 to 30 weight % polymer particles, based on the total weight of the dispersion and the polymer particles have an average size of from 10 nm to 10000 nm.

13. The polyurethane foam of claim 1 wherein the polymer polyol dispersion has a polymer content of about 10 percent by weight based on total weight of dispersion and a viscosity at 25° C. of from about 1000 mPa.s to about 1700 mPa.s.

14. The polyurethane foam of claim 1 wherein the foam is flexible or semi-flexible.

* * * * *

UNITED STATES PATENT AND TRADEMARK OFFICE
CERTIFICATE OF CORRECTION

PATENT NO. : 4,789,690

DATED : December 6, 1988

INVENTOR(S) : Olga Milovanovic-Lerik, et al

It is certified that error appears in the above-identified patent and that said Letters Patent is hereby corrected as shown below:

On the cover page correct the Filing Date. It reads "March 30, 1987" it should read --January 30, 1987--.

Signed and Sealed this

Fifth Day of November, 1991

*Attest:*

HARRY F. MANBECK, JR.

*Attesting Officer*　　　*Commissioner of Patents and Trademarks*